Patented Feb. 10, 1925.

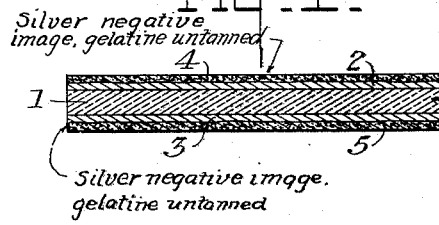
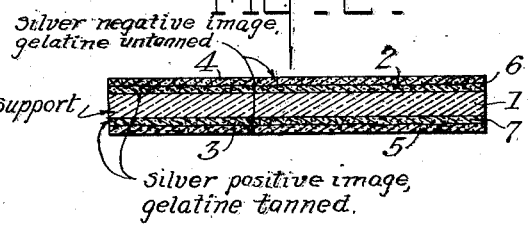
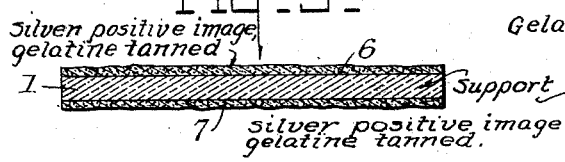
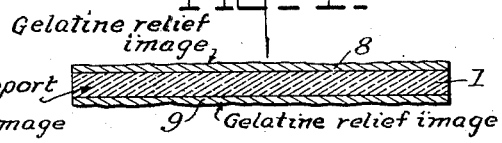
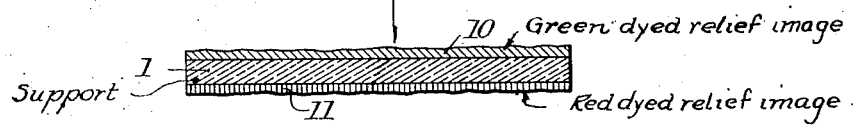

1,525,766

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

COLOR PHOTOGRAPHY.

Application filed July 12, 1922. Serial No. 574,364.

*To all whom it may concern:*

Be it known that I, JOHN G. CAPSTAFF, a subject of the King of Great Britain, residing at Rochester, in the county of Monroe and State of New York, have invented certain new and useful Improvements in Color Photography, of which the following is a full, clear, and exact specification.

This invention relates to color photography and particularly to that method of making color reproductions that comprises forming in registry upon opposite surfaces of a transparent support two images in complementary colors.

One of the methods by which color images have been made is by forming relief images in a colloid, dyeing these, and then superposing the dyed images. These relief images have been made by hardening or tanning the colloid in accordance with a photographic image and washing off the unaffected colloid. Inasmuch as the hardened or tanned portion is that part facing the printing light, it has been necessary either to transfer the affected colloid layer, and wash off what had been the lower portion; or to print through a transparent support and wash off the upper layer. Either method was inapplicable to the formation of a relief image in emulsions already coated on the opposite surfaces of a transparent support. I have discovered a method by which the "wash-off" process may be applied to such coatings so that the lower portions next the support will be tanned or hardened, leaving the upper portions relatively unaffected and capable of being washed off. This method is further applicable to the making of single relief images on transparent or opaque supports.

In order to make the steps of my process clearer reference will be made to the accompanying drawings, all of which are in section and on a much enlarged scale and in which the same reference characters are used throughout to designate the same part.

Fig. 1 shows a negative silver image formed in each coating by a non-tanning developer;

Fig. 2 shows in addition to the original negative silver image, a silver positive image formed in the same coating by a tanning developer;

Fig. 3 shows the relief left by washing off the untanned portions;

Fig. 4 shows the bleached relief images;

Fig. 5 shows the dyed relief images; and

Fig. 6 shows a single relief image on an opaque support.

Upon a transparent support 1 such as motion picture film, with sensitive photographic gelatino-bromide emulsion coatings 2 and 3 upon the opposite surfaces, there are formed registering silver images 4 and 5. The light images are printed or projected thereon by any known methods, one image being the result of an exposure of the desired subject through a red filter and the other being the result of an exposure through a green filter. The silver images shown are then developed by the use of a developer such as monomethyl paramidophenol-sulfate which does not have any appreciable action in the way of hardening or tanning the gelatine emulsion. After washing, but without fixing, the emulsions are exposed to light, thus rendering developable all the undeveloped grains of silver salt, after which the film is submitted to a developer, such as pyro, having a strong tanning action on the gelatine in the vicinity of the grains being developed. There are thus formed silver images 6 and 7 in the lower portions of the layers 2 and 3, these images being in a mass of differentially tanned or hardened gelatine, and being the inverse of the images 4 and 5. If, as I prefer, the images 4 and 5 are negatives, the corresponding images 6 and 7 will be positives. At this period the film if examined will appear to be of uniform heavy density. It is then submitted to warm water and the still soluble outer portions including the negative images 4 and 5 are washed off, leaving the insoluble lower portions including the positive silver images 6 and 7. The silver is then removed from the gelatine by any well known reducing agent such as an acid permanganate bath, leaving the transparent gelatine relief images 8 and 9. These images are then dyed with colors, complementary to each other, and to the taking filters, so as to produce a two-color image when viewed by transmitted light. As here shown, there is a green dyed relief image 10 on one surface and a red dyed relief image 11 on the other surface.

I do not adhere to any particular formulæ for the developing and reducing baths as these are well known. It is necessary only that the first developing bath have the minimum tanning action and the second have great tanning action. For the sake of completeness I will mention as satisfactory examples of the baths the following:

First developing bath:
| | |
|---|---|
| Monomethyl para-midophenol-sulfate | 20 grams |
| Sodium sulfite | 195 " |
| Potassium bromide | 2.5 " |
| Potassium carbonate | 70 " |
| Water | 3000 cc. |

Second developing bath:
| | |
|---|---|
| Pyrogallic acid | 110 grams |
| Sodium sulfite | 440 " |
| Sodium carbonate | 440 " |
| Water | 1000 cc. |

Reducing bath:
| | |
|---|---|
| Potassium permanganate | 2 grams |
| Sulphuric acid | 10 cc. |
| Water | 1000 " |

The utilized properties of the baths are, in themselves, well known, and many equivalent baths might be mentioned.

The advantages of this process are obvious. It permits the printing of the image from the front of each emulsion and avoids any transfer or registration of layers containing images. It is to be understood that when the support is spoken of as transparent, I mean that at the finish of the process it will transmit such light as is desirable or necessary with the colored images to give the desired effect.

It is to be understood that, while I have shown the process applied to a two-color process, the invention extends also to the method of formation of the individual image whatever the nature of the support on which the sensitive layer is carried. It is possible thus to make a wash off image directly on its permanent support without exposure through its support. Fig. 6 shows such an image 12 on an opaque support 13, such as paper, the steps necessary to make such a single image being analogous to those already described.

It is not always necessary to expose to light before the second development if the developer is of such high reducing power that it will act on the silver bromide, whether exposed or not. Such developers as caustic-pyro, without bromide, produce general fog and are, therefore, of little use for ordinary purposes but can be used for my purposes, since they develop the undeveloped grains and have a strong tanning action.

Having thus described my invention, what I claim as new and desire to secure by Letters Patent is:

1. The process of making a photographic relief image that comprises exposing to a light image a colloid layer containing sensitive salts to light, submitting the layer to a bath that will develop an image therein without rendering the colloid insoluble, submitting the layer to a bath that will develop the hitherto undeveloped portions thereof and render insoluble the portions of the colloid immediately adjacent the newly developed grains and then washing off the soluble gelatine.

2. The process of making a photographic relief image that comprises exposing on its front surface a colloid layer containing sensitive silver salts and carried by a support to a light image, submitting the exposed layer on its support to a developer that forms a silver image therein without affecting the colloid, submitting the layer on its support to a developer that forms a silver image therein and differentially tans the colloid, washing off the untanned colloid leaving a relief image on its original support.

3. The process of making a colored image that comprises exposing a colloid layer containing a sensitive silver salt to light, developing in said layer a silver image by the agency of a developer that does not render the colloid insoluble, and developing the hitherto undeveloped portions by the agency of a developer that renders the gelatine insoluble, washing off the soluble gelatine, thus leaving a relief image and dyeing the relief image.

4. The process of making a colored image that comprises exposing a colloid layer containing a sensitive silver salt to light so controlled as to render a part of said salt developable, developing a silver image by the agency of a developer that does not render the colloid insoluble, and developing the rest of the salt to silver, by the agency of a developer that renders the colloid insoluble in the immediate vicinity of the grains developed thereby, washing off the soluble gelatine, thus leaving a relief image, removing the silver from the relief image and dyeing the relief image.

5. In color photography, the method of making two-color records in registry in layers containing sensitive silver salts on opposite surfaces of a support that comprises the formation of silver images in each layer by exposure and development in a non-tanning developer, and a second development in a tanning developer, the removal of the untanned portions of the layers, the removal of the silver from the layers, and the dyeing of the layers.

6. In color photography the method of making two-color records in registry in colloid layers containing sensitive silver salts on opposite surfaces of a support that comprises forming of a silver image in each layer by exposure to a light image and development by an agent that does not affect the colloid, then forming in each layer a second silver image inverse to the first by development by an agent that renders the colloid insoluble adjacent to the image developed thereby, washing off the unaffected colloid, leaving a relief image in each layer, and dyeing the relief images with dyes of different colors.

7. In color photography the method of making two-color records in registry in colloid layers containing sensitive silver salts on opposite surfaces of a transparent support that comprises exposing the layers to light corresponding to different color aspects of a subject, submitting them to a developer that forms silver images therein without affecting the colloid, and submitting them to a developer that forms silver images therein and tans the colloid differentially, washing off the unaffected colloid, thus leaving relief images, removing the silver therefrom and dyeing the relief images in colors complementary to each other and to the light by which the corresponding images were first produced.

Signed at Rochester, New York, this 8th day of July 1922.

JOHN G. CAPSTAFF.